United States Patent
Hallock (10) Patent No.: US 11,691,301 B2
(45) Date of Patent: Jul. 4, 2023

(54) DETECTION AND MEASUREMENT OF WEAR OF ROBOTIC MANIPULATOR TOUCH POINTS

(71) Applicant: Kindred Systems Inc., San Francisco, CA (US)

(72) Inventor: David Gabriel Hallock, San Francisco, CA (US)

(73) Assignee: OCADO INNOVATION LIMITED, Hatfield (GB)

( * ) Notice: Subject to any disclaimer, the term of this patent is extended or adjusted under 35 U.S.C. 154(b) by 649 days.

(21) Appl. No.: 16/694,923

(22) Filed: Nov. 25, 2019

(65) Prior Publication Data
US 2020/0171679 A1    Jun. 4, 2020

Related U.S. Application Data

(60) Provisional application No. 62/772,812, filed on Nov. 29, 2018.

(51) Int. Cl.
| | |
|---|---|
| *B25J 19/00* | (2006.01) |
| *B25J 19/02* | (2006.01) |
| *B25J 15/00* | (2006.01) |

(52) U.S. Cl.
CPC .......... *B25J 19/0066* (2013.01); *B25J 15/00* (2013.01); *B25J 19/023* (2013.01); *B25J 19/027* (2013.01)

(58) Field of Classification Search
CPC ...... B25J 15/00; B25J 19/0066; B25J 19/023; B25J 19/027
See application file for complete search history.

(56) References Cited

U.S. PATENT DOCUMENTS

| | | | |
|---|---|---|---|
| 2,706,509 A | 4/1955 | White | |
| 6,090,475 A * | 7/2000 | Robinson | B24D 11/00 |
| | | | 451/6 |
| 6,275,748 B1 * | 8/2001 | Bacchi | H01L 21/68707 |
| | | | 700/250 |
| 6,457,566 B1 | 10/2002 | Toby | |
| 2003/0202895 A1 * | 10/2003 | Althouse | F01C 21/0809 |
| | | | 418/2 |
| 2004/0222084 A1 * | 11/2004 | Wigg | C23F 13/22 |
| | | | 204/196.07 |
| 2006/0273148 A1 * | 12/2006 | Karstens | B60C 11/24 |
| | | | 235/375 |
| 2007/0025887 A1 * | 2/2007 | Baeuerle | G01N 35/0099 |
| | | | 422/400 |

(Continued)

FOREIGN PATENT DOCUMENTS

| | | | | |
|---|---|---|---|---|
| EP | 1 997 647 A1 | 12/2008 | | |
| WO | WO-9408751 A1 * | 4/1994 | ......... | G05B 19/4097 |
| WO | WO-2020041819 A1 * | 3/2020 | ............ | B25J 13/085 |

*Primary Examiner* — Daniel L Greene
(74) *Attorney, Agent, or Firm* — Seed Intellectual Property Law Group LLP (57) ABSTRACT

A robotic system includes a robotic manipulator having one or more contact pads. The contact pads have features therein that are detectable to determine or measure a degree to which they have worn down. Such features may include fluorescent materials, colorful materials, and/or RFID tags. A robotic environment may include one or more sensors to detect such features, and may be configured to generate a signal indicating that one or more contact pads are in need of maintenance.

20 Claims, 6 Drawing Sheets

(56) References Cited

U.S. PATENT DOCUMENTS

| | | | |
|---|---|---|---|
| 2007/0200379 A1* | 8/2007 | Key | B25J 15/0475 |
| | | | 294/902 |
| 2010/0248595 A1* | 9/2010 | Dinh-Ngoc | B24B 53/12 |
| | | | 451/443 |
| 2013/0285829 A1* | 10/2013 | Pacheco | G06K 19/0773 |
| | | | 340/854.6 |
| 2013/0318749 A1* | 12/2013 | Segura | F16G 13/12 |
| | | | 24/265 AL |
| 2014/0265394 A1* | 9/2014 | Pergande | H01L 21/67742 |
| | | | 294/81.5 |
| 2016/0075189 A1* | 3/2016 | Engel | G06K 7/10366 |
| | | | 340/438 |
| 2018/0089615 A1* | 3/2018 | Mattingly | G06Q 10/20 |
| 2018/0145401 A1* | 5/2018 | DeBates | G06K 19/07798 |
| 2019/0381670 A1* | 12/2019 | Correll | B25J 9/1697 |

\* cited by examiner

DETECTION AND MEASUREMENT OF WEAR OF ROBOTIC MANIPULATOR TOUCH POINTS

BACKGROUND

Technical Field

The present disclosure relates generally to robotic manipulators, and more particularly to systems and methods for detection and measurement of wear of robotic manipulator touch points.

Description of the Related Art

Robotic end-of-arm tooling (EOAT) and robotic end effectors take many forms. Generally speaking, an end effector is a component at the terminal, distal end of a robotic arm and is configured to perform one or more of various actions, and may take the form of a gripper, a cutting tool, or other device. Robotic manipulators, which represent one type of robotic end effector, are generally configured to grasp or otherwise hold objects and move the objects in space. Robotic manipulators may be impactive robotic manipulators, which typically use jaws, fingers, or other similar mechanisms to grasp an object to be moved, such that the object is held by frictional forces. Robotic manipulators may also be astrictive robotic manipulators, which typically use vacuum, magnetic, or electrical devices, or other similar mechanisms, to grasp an object to be moved, such that the object is held by attractive forces such as suction, magnetism, or electroadhesion.

BRIEF SUMMARY

The embodiments described herein are directed to methods and systems for detecting, measuring, and/or determining an amount of wear on a contact pad of a robotic manipulator, such as at a touch point or a finger-tip thereof, or on other tooling or devices, such as robotic feet, tires, and other touch points that regularly contact other objects, and which may be prone to degradation over time as a result. The robotic manipulator may be implemented in pick-and-place, gripping, and/or sorting applications, and may be powered electrically, hydraulically, mechanically, or pneumatically.

Such a robotic manipulator may be used within a storage space, such as a bin, box, sorting station, room, or volume that is used to store, hold, warehouse, or otherwise contain objects, or an assembly line. Such a robotic manipulator may also be used in a retail supply chain warehouse, where the objects include apparel, consumer goods, merchandise, and the like, and may be used with other objects such as tools, parts, components, packages, letters, foodstuffs, and the like.

A contact pad for use in a robotic manipulator may be summarized as comprising: a body having a proximal end and a distal end opposite to the proximal end across a length of the contact pad, a first side and a second side opposite to the first side across a thickness of the contact pad, and a first edge and a second edge opposite to the first edge across a width of the contact pad; a touch point at the distal end of the body; and a layer of fluorescent material embedded within the body.

The layer of fluorescent material may have a visible color that is different than a visible color of the rest of the body of the contact pad. The layer of fluorescent material may include an embedded radio-frequency identification tag. The contact pad may be formed from an electrically conductive material. The contact pad may include an aperture that extends from the first side to the second side. The contact pad may include a distal layer of material and a proximal layer of material, and the layer of fluorescent material may be located between the distal layer of material and the proximal layer of material. A length of the layer of fluorescent material along the length of the body of the contact pad may be less than 25% of a length of the distal layer of material along the length of the contact pad and less than 25% of a length of the proximal layer of material along the length of the contact pad. A length of the distal layer of material along the length of the body of the contact pad may be less than 25% of a length of the proximal layer of material along the length of the body of the contact pad. The layer of fluorescent material may be oriented substantially parallel to the thickness of the body of the contact pad, within 30° of perpendicular to the length of the body of the contact pad, and within 30° of parallel to the width of the body of the contact pad. The layer of fluorescent material may be oriented within 30° of parallel to the touch point at the distal end of the body of the contact pad.

A robotic system may be summarized as comprising: a robotic manipulator including a contact pad, wherein the contact pad includes a body having a proximal end and a distal end opposite to the proximal end across a length of the contact pad, a first side and a second side opposite to the first side across a thickness of the contact pad, and a first edge and a second edge opposite to the first edge across a width of the contact pad; a touch point at the distal end of the body of the contact pad; and a radio-frequency identification tag embedded within the body of the contact pad.

The radio-frequency identification tag may be embedded within a layer of fluorescent material within the body of the contact pad. The layer of fluorescent material may have a visible color that is different than a visible color of the rest of the body of the contact pad.

A robotic system may be summarized as comprising: a robotic manipulator including a contact pad, wherein the contact pad includes a body having a proximal end and a distal end opposite to the proximal end across a length of the contact pad, a first side and a second side opposite to the first side across a thickness of the contact pad, and a first edge and a second edge opposite to the first edge across a width of the contact pad; a touch point at the distal end of the body of the contact pad; a source of electromagnetic radiation embedded within the body of the contact pad; and a sensor configured to detect electromagnetic radiation generated by the source of electromagnetic radiation embedded within the body of the contact pad and communicate a measurement of the electromagnetic radiation to a control system.

The source of electromagnetic radiation may be a layer of fluorescent material embedded within the body of the contact pad. The sensor may be a photodiode. The source of electromagnetic radiation may be a layer of material that has a visible color different than a visible color of the rest of the body of the contact pad. The sensor may be a camera. The source of electromagnetic radiation may be an embedded radio-frequency identification tag. The sensor may be a radio-frequency identification reader.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with the technology have not been shown or described in detail to avoid unnecessarily obscuring descriptions of the embodiments.

Figure 1:
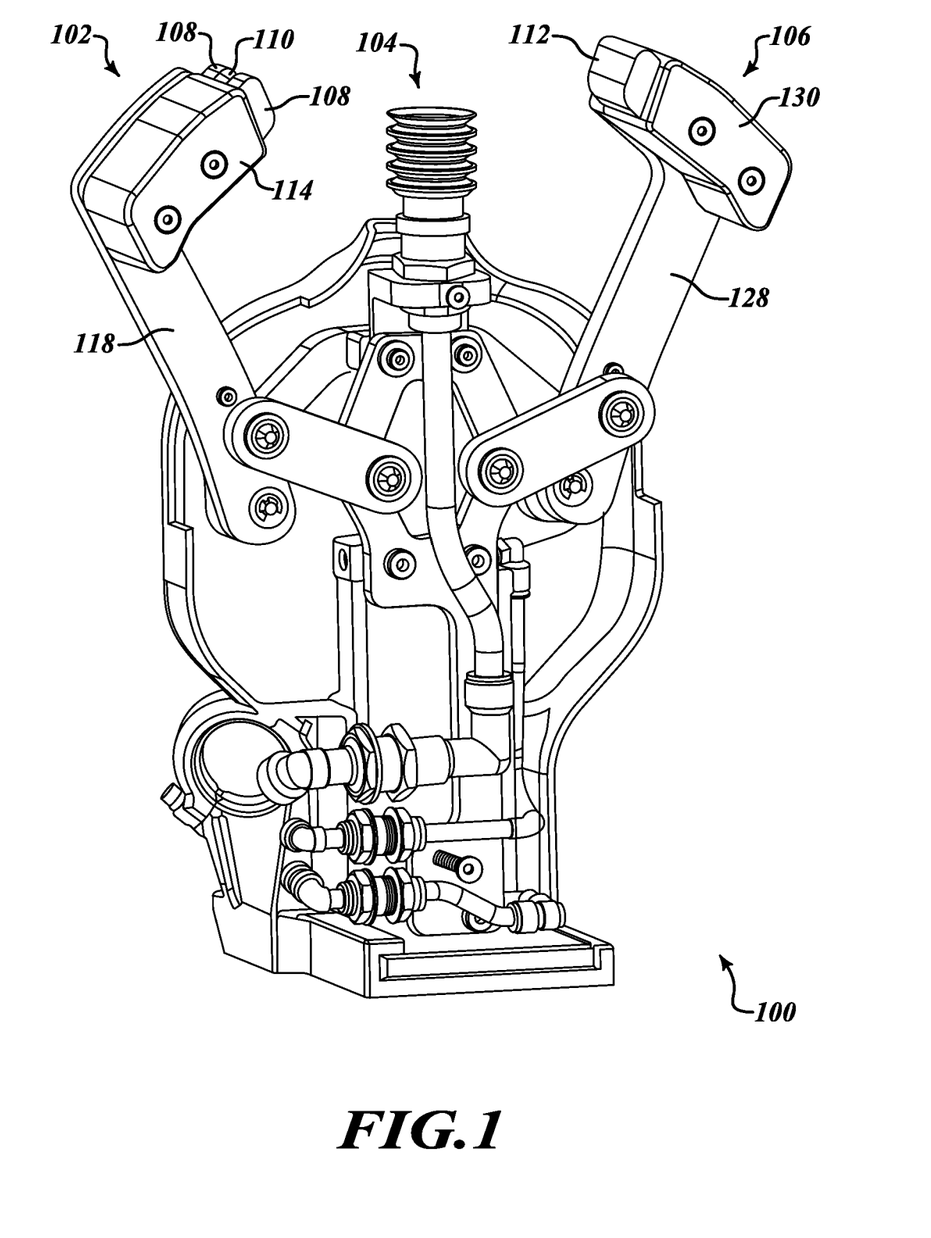
FIG. 1 illustrates a perspective view of a robotic end effector according to an embodiment of the present disclosure.

FIG. 1 illustrates a robotic system 100 including a first robotic manipulator 102, which may be referred to herein as a first gripping finger 102, a second robotic manipulator 104, which may be referred to herein as a suction gripper 104, and a third robotic manipulator 106, which may be referred to herein as a second gripping finger 106. As illustrated in FIG. 1, the gripping fingers 102 and 106 are positioned on opposite sides of the suction gripper 104. The first gripping finger 102 may include several contact pads including two peripheral contact pads 108, which may be non-conductive contact pads 108, and a central contact pad 110, which may be a conductive contact pad 110. The contact pads 108, 110 may be compliant, semi-compliant, rigid, or semi-rigid. The second gripping finger 106 may include a contact pad 112, which may be a conductive contact pad 112. When the conductive contact pad 110 contacts the conductive contact pad 112, an electrical circuit is closed, thereby generating a contact signal. Thus, the conductive contact pads 110 and 112 together form a contact sensor. In some embodiments, the robotic system 100, including the suction gripper 104 and the first and second gripping fingers 102 and 106, may be controlled based at least in part on such a contact signal.

Figure 2:
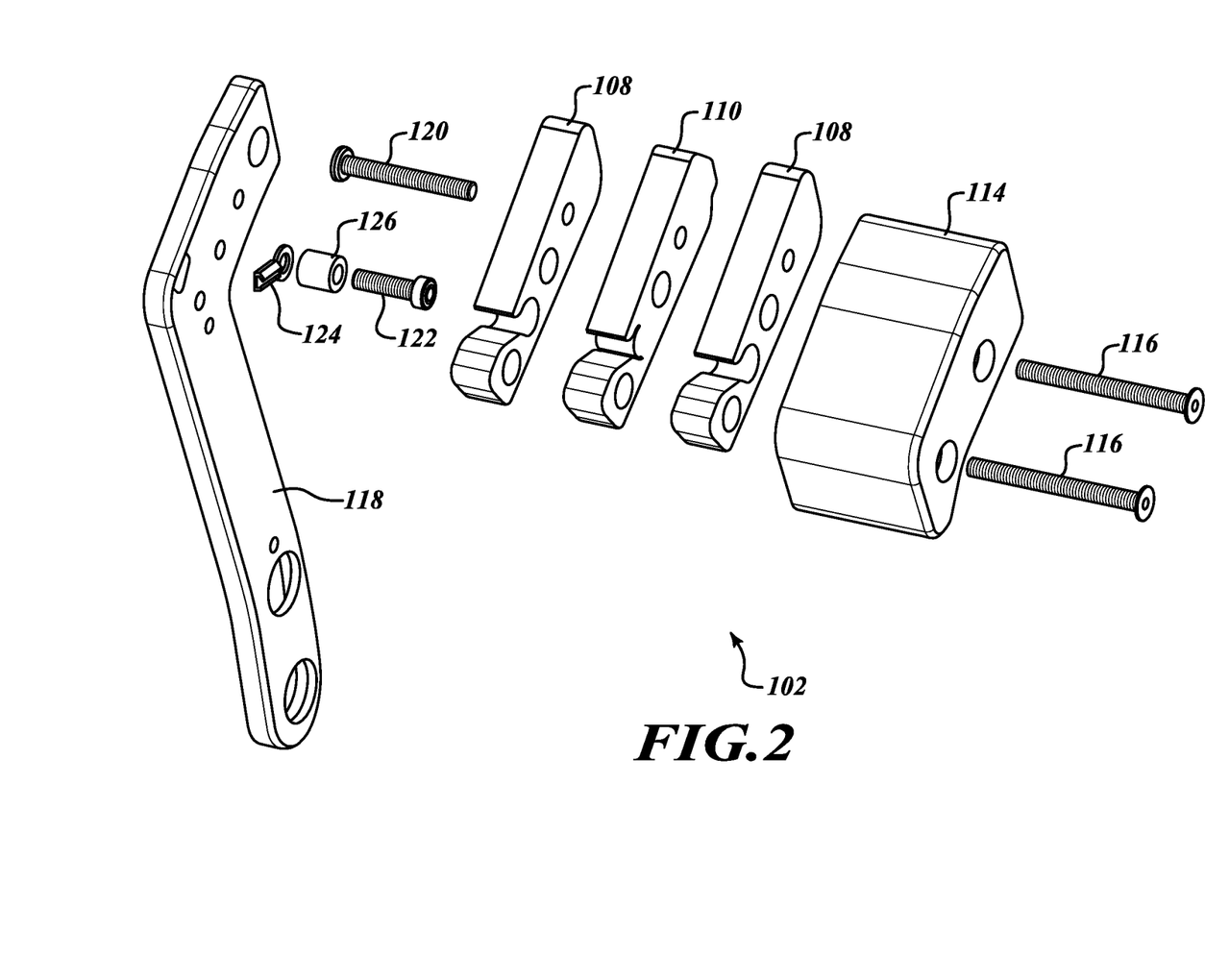
FIG. 2 illustrates an exploded view of a portion of the robotic end effector of FIG. 1 according to an embodiment of the present disclosure.

FIG. 2 illustrates an exploded view of the first gripping finger 102. The first gripping finger 102 includes the conductive contact pad 110 located between the non-conductive contact pads 108. The conductive contact pad 110 and non-conductive contact pads 108 may be formed from conductive silicone and non-conductive silicone materials, respectively. In some embodiments, the non-conductive contact pads 108 may be formed from an elastomer, a rubber, a polymer, a plastic, a foam, a sponge, or another material or structure that provides sufficient elasticity. In some embodiments, the conductive contact pad 110 may be formed from a conductive elastomer such as multicon, radthin, or any of the following materials impregnated with metal, wire mesh, or conductive materials: an elastomer, a rubber, a polymer, a plastic, a foam, a sponge, or another material or structure that provides sufficient elasticity. In yet other embodiments, the conductive contact pad 108 may be formed from a metal or a metallic alloy.

The contact pads 108 and 110 may be enclosed or at least partially enclosed within a cover 114, which may be made from nylon or any type of elastomer, plastic, rubber, and the like. In one embodiment, the cover 114 is made from a non-conductive material. Bolts 116 are used secure the cover 114 to the contact pads 108 and 110, as well as to a first support linkage or arm 118. Bolt 120 is further used to secure the contact pads 108 and 110 to the first support arm 118. Bolt 122 is used to secure a ring terminal 124 to the first support arm 118. In an embodiment, a spacer 126 is sandwiched between the ring terminal 124 and a head of the bolt 122. In an embodiment, the spacer 126 is made from a non-conductive material. The cover 114 and contact pads 108 and 110 may be secured to the first support arm 118 with any known methods, such as via bolts, screws, clips, male/female connectors, and the like.

In an embodiment, the first support arm 118 includes a cover formed from nylon or any type of elastomer, plastic, rubber, and the like. In an embodiment, such a cover of the first support arm 118 is made from a non-conductive material. In another embodiment, the contact pads 108 and 110 are secured to each other by bonding, such as via adhesive, resin, epoxy, glue, or a hot-melt process. In yet another embodiment, the contact pads 108 and 110 are integrally formed with one another and from a non-conductive material, where the central portion representing the conductive contact pad 110 is impregnated with a conductive material, or where a conductive material is added to an outer surface of the conductive contact pad 110.

Figure 3:
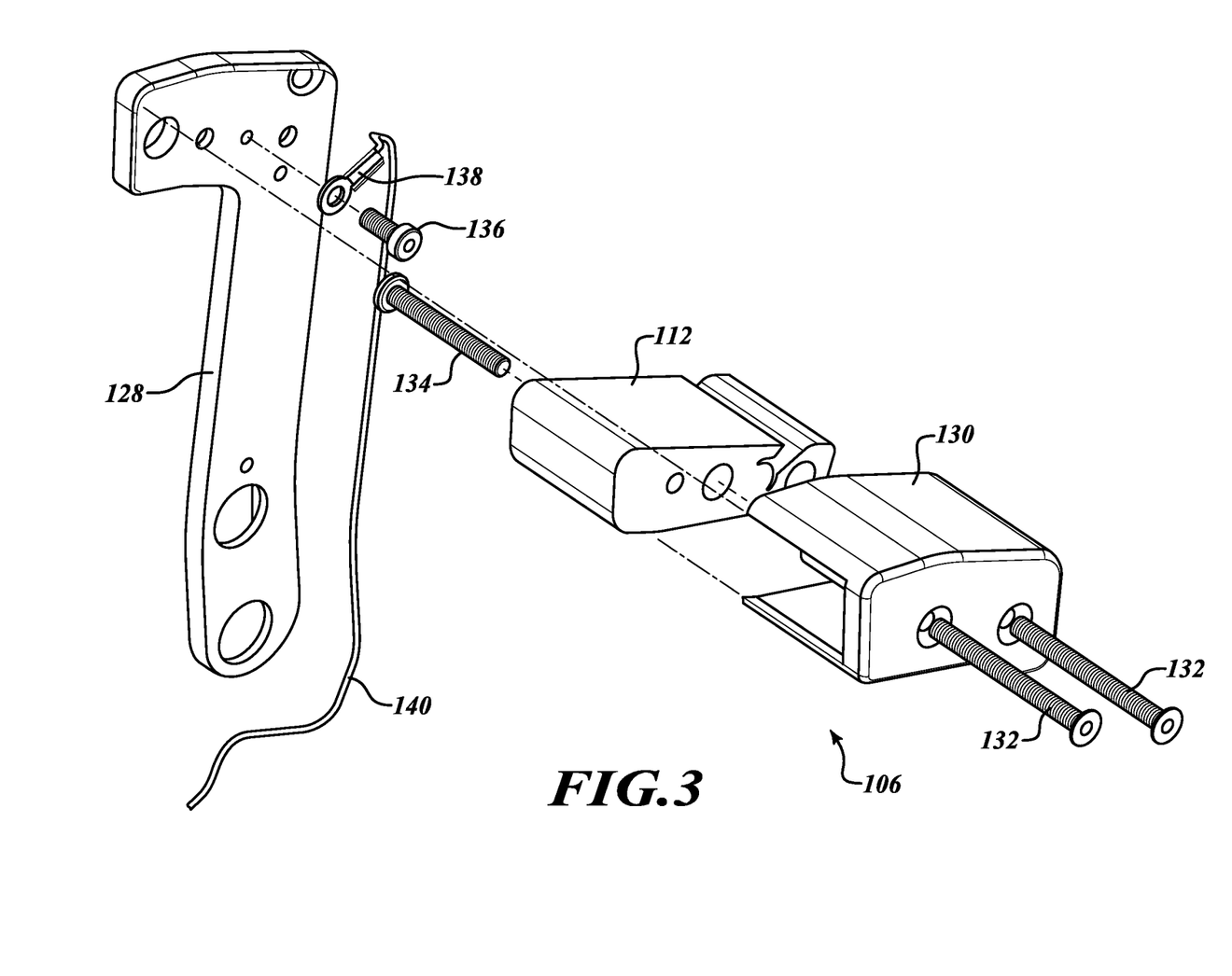
FIG. 3 illustrates another exploded view of a portion of the robotic end effector of FIG. 1 according to an embodiment of the present disclosure.

FIG. 3 is an exploded view of the second gripping finger 106. The second gripping finger 106 is attached to the rest of the robotic system 100 by a second support arm 128. In an embodiment, the conductive contact pad 112 may be formed from a conductive silicone or a conductive elastomer such as multicon, radthin, or any of the following materials impregnated with metal, wire mesh, or conductive materials: an elastomer, rubber, polymer, plastic, foam, sponge, or other material or structure that provides sufficient elasticity. In other embodiments, the conductive contact pad 112 is formed from a metal or a metallic alloy. In some embodiments, the conductive contact pad 112 is surrounded or at least partially surrounded by a non-conductive cover 130, which may be made from nylon or any type of elastomer, plastic, rubber, and the like.

Bolts 132 are used secure the cover 130 to the conductive contact pad 112, as well as to the second support arm 128. Bolt 134 is used to secure the conductive contact pad 112 to the second support arm 128. Bolt 136 is used to secure a ring terminal 138 to the second support arm 128. The cover 130 and conductive contact pad 112 may be secured to the second support arm 128 using any known methods, such as bolts, screws, clips, male/female connectors, and the like.

The ring terminal 138 is coupled to an electrical wire 140. The electrical wire 140 is coupled to a controller or other electronic components at an end thereof opposite the ring terminal 138. In an embodiment, ring terminal 124 also includes an electrical wire that is similarly coupled to the controller or other electronic components at an end thereof opposite the ring terminal 124. The electrical wires may be used to communicate data, such as control, position, orientation, and/or pressure information, and the like, between the controller or other electronic components and sensors and/or motors located on the first and second gripping fingers 102 and 106, or elsewhere within the robotic system 100.

In an embodiment, the first and second gripping fingers 102, 106, and/or other components of the robotic system 100, may include various sensors, such as, but not limited to, electrical continuity sensors, pressure transducers, gyroscopes, accelerometers, altimeters, accelerometers, rotational sensors, temperature sensors, optical sensors, imaging and vision systems, microwave sensors, infrared sensors, ultrasonic sensors, vibration sensors, acoustic sensors, and the like.

In an embodiment, the first and second gripping fingers 102, 106, and/or other components of the robotic system 100, may include a wireless transceiver that communicates wirelessly with a transceiver located on, for example, the controller or other electronic components to which the terminals 124 and 138 are coupled. In such an embodiment, the electrical wires coupled to the terminals 124 and 138 may be replaced with wireless transceivers. In yet another embodiment, the robotic system 100 includes both the electrical wires and the wireless transceivers.

Additional details regarding the robotic system 100 may be found in U.S. patent application Ser. No. 16/565,186, filed Sep. 9, 2019, which is hereby incorporated herein by reference in its entirety.

Figure 4:
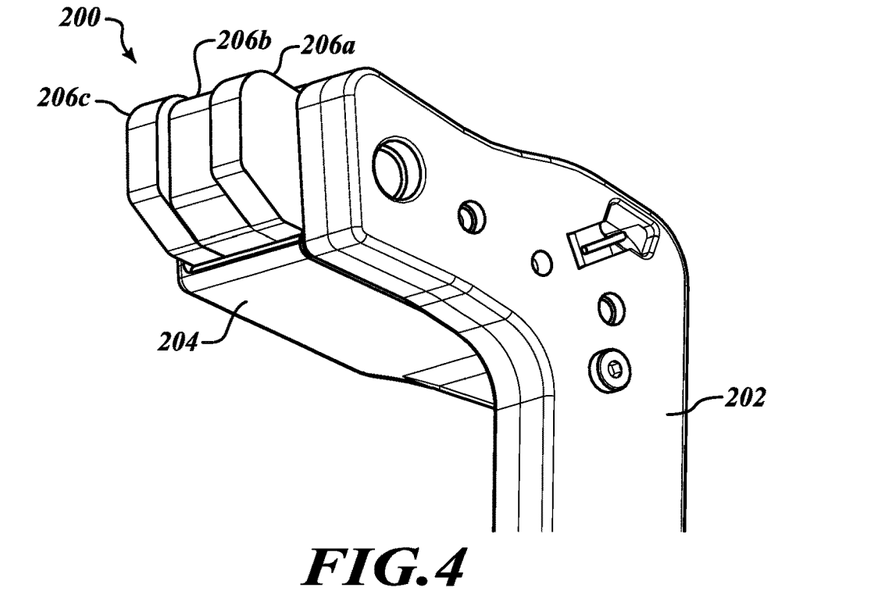
FIG. 4 illustrates a perspective view of a robotic manipulator and a robotic manipulator touch point according to an embodiment of the present disclosure.
Figure 5:
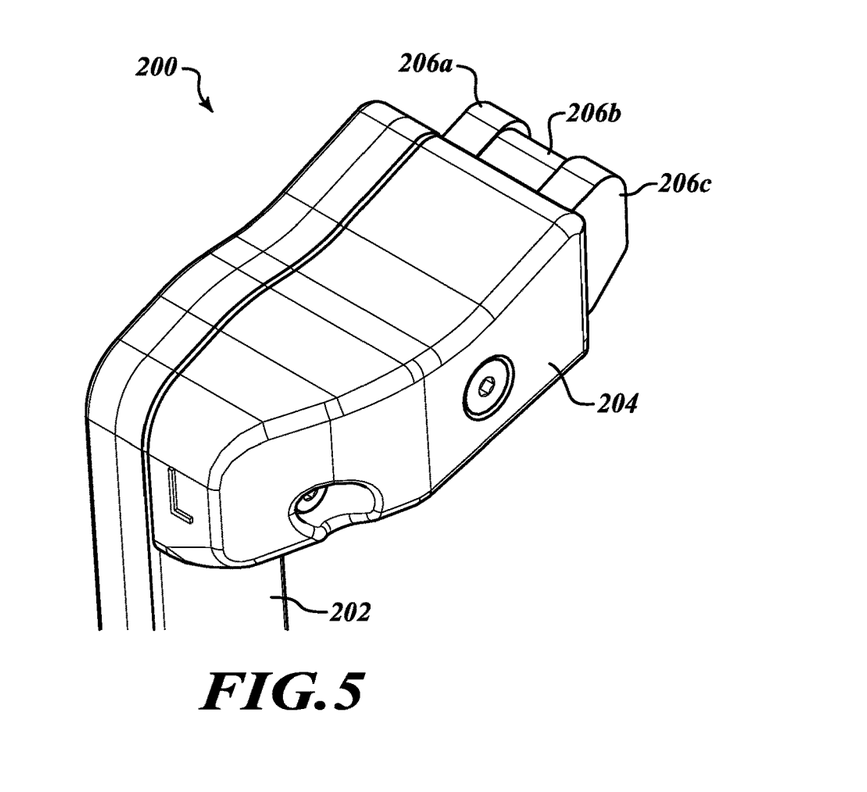
FIG. 5 illustrates another perspective view of the robotic manipulator of FIG. 4 according to an embodiment of the present disclosure.
Figure 6:
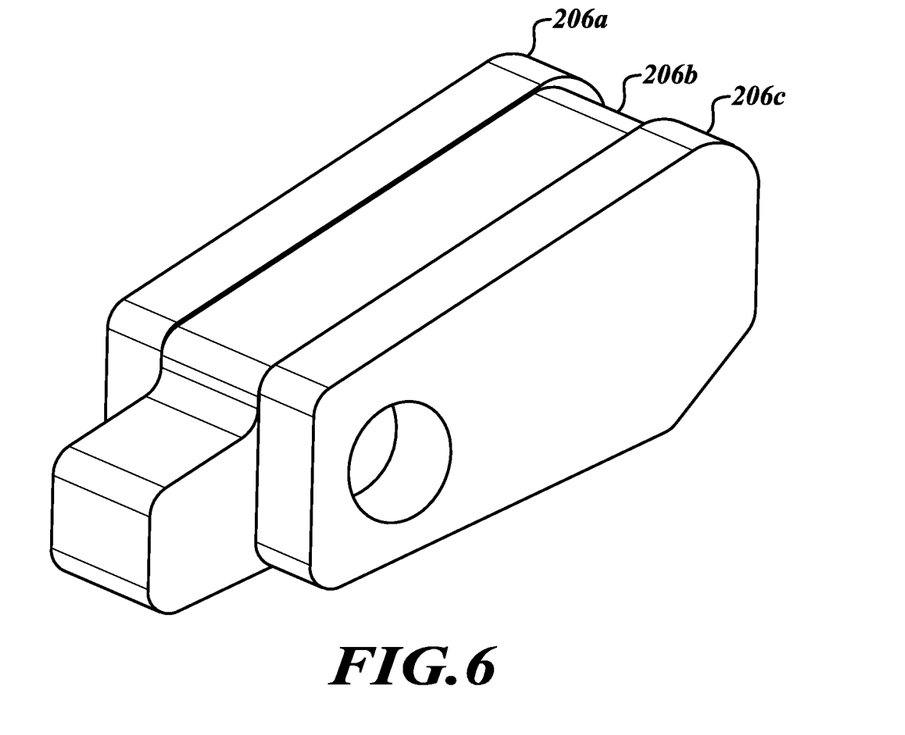
FIG. 6 illustrates a perspective view of components of the robotic manipulator of FIG. 4 according to an embodiment of the present disclosure.

FIGS. 4 and 5 illustrate two different perspective views of another robotic manipulator 200. As illustrated in FIGS. 4 and 5, the robotic manipulator 200 includes a support arm 202 that corresponds to the first and second support arms 118 and 128, a housing 204 that corresponds to the covers 114 and 130, and three contact pads 206a, 206b, and 206c that correspond to the contact pads of the robotic system 100 described with respect to FIGS. 1-3. FIG. 6 illustrates a perspective view of the three contact pads 206a, 206b, and 206c of the robotic manipulator 200 illustrated in FIGS. 4 and 5.

Figure 7:
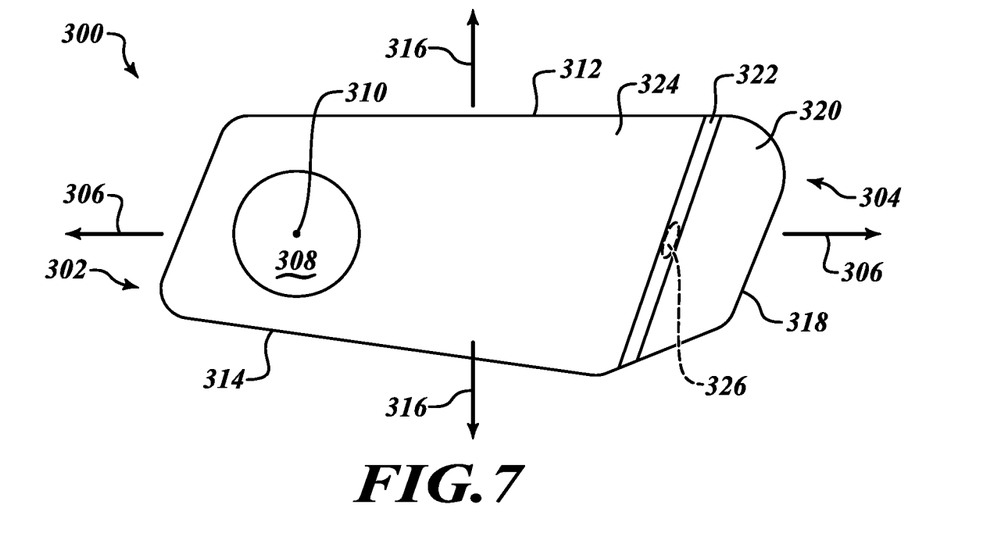
FIG. 7 illustrates a perspective view of a component of a robotic manipulator according to an embodiment of the present disclosure.

FIG. 7 illustrates a side view of a contact pad 300, which may be for use in a robotic manipulator, such as a gripping finger, of a piece of robotic end-of-arm-tooling equipment located at a terminal distal end of a robotic arm. In some embodiments, the contact pad 300 may be used as one of the contact pads 108, 110, 112, 206a, 206b, and/or 206c, and the contact pad 300 may include any of the features described herein with respect to the contact pads 108, 110, 112, 206a, 206b, and 206c. As illustrated in FIG. 7, the contact pad 300 has a first, proximal end 302 and a second, distal end 304 opposite to the first, proximal end 302. The proximal end 302 of the contact pad 300 may be the end of the contact pad 300 that is closest to the rest of the robotic system to which the contact pad 300 is coupled, such as to a support arm, electronics, controllers, and/or actuators thereof. The distal end 304 of the contact pad 300 may be the end of the contact pad 300 that is farthest from the rest of the robotic system to which the contact pad 300 is coupled, such as from a support arm, electronics, controllers, and/or actuators thereof.

As illustrated in FIG. 7, the contact pad 300 has a length that extends from the proximal end 302 thereof to the distal end 304 thereof along a first, longitudinal axis 306 of the contact pad 300. As illustrated in FIG. 7, the contact pad 300 has a bore hole or an opening or an aperture 308 located proximate the proximal end 302 of the contact pad 300 and that extends through a thickness of the contact pad 300 from a first side thereof visible in FIG. 7 to a second side thereof opposite to the first side thereof. As illustrated in FIG. 7, the aperture 308 is cylindrical and extends along a second, transverse axis 310, which is a central longitudinal axis with respect to the aperture 308, from a first end of the aperture 308 at the first side of the contact pad 300 to a second end of the aperture 308 at the second side of the contact pad 300 and opposite the first end thereof, where the second, transverse axis 310 is illustrated as extending into the page in FIG. 7 and is perpendicular to the first, longitudinal axis 306 of the contact pad 300.

As also illustrated in FIG. 7, the contact pad 300 has a width that extends from a first edge 312 of the contact pad 300 to a second edge 314 of the contact pad 300 along a third axis 316 of the contact pad 300, where the third axis 316 of the contact pad 300 is perpendicular to both the first, longitudinal axis 306 of the contact pad 300 and the second, transverse axis 310. In some embodiments, the length of the contact pad 300 along the first, longitudinal axis 306 is larger than the width of the contact pad 300 along the third axis 316, and the width of the contact pad 300 along the third axis 316 is larger than the thickness of the contact pad 300 along the second, transverse axis 310. In some embodiments, the contact pad 300 has a cross-sectional shape when viewed along the first, longitudinal axis 306, at any location, substantially any location, or a majority of locations along the first, longitudinal axis 306, that is rectangular or substantially rectangular. Such a rectangular or substantially rectangular cross-sectional shape may have a long axis defined by the width of the contact pad 300 along the third axis 316 and a short axis defined by the thickness of the contact pad 300 along the second, transverse axis 310.

When the contact pad 300 is integrated into a robotic manipulator, it may be mounted on other components thereof, and another portion of the robotic manipulator, such as a bolt, screw, shaft, boss, or other protrusion or cylindrical body, may extend through the aperture 308 to lock the contact pad 300 to the rest of the robotic manipulator and prevent or reduce movement and/or rotation of the contact pad 300 with respect to the rest of the robotic manipulator. In some embodiments, a distal end surface 318 of the contact pad 300 may face distally outward from the body of the contact pad 300 and may form a touch point of the contact pad 300 and the robotic manipulator of which it is a part, and may be configured to contact, hold, and otherwise physically engage with an object to be held by the robotic manipulator.

As also illustrated in FIG. 7, the contact pad 300 includes distinct layers of different materials arranged at different locations along the length of the contact pad 300 between the proximal end 302 thereof and the distal end 304 thereof. As one example, in the embodiment illustrated in FIG. 7, the contact pad 300 includes a first, distal layer of material 320 at the distal end 304 of the contact pad 300, a second, intermediate layer of material 322 at an intermediate location between the distal end 304 and the proximal end 302 of the contact pad 300, and a third, proximal layer of material 324 at the proximal end 302 of the contact pad 300. In some embodiments, the first, distal layer of material 320 and the third, proximal layer of material 324 may be formed from the same material(s), which may be any of the materials described herein with respect to the contact pads 108, 110, 112, 206a, 206b, and/or 206c.

In some embodiments, the second, intermediate layer of material 322 may be much narrower in a direction aligned with the first, longitudinal axis 306 than either the first, distal layer of material 320 or the third, proximal layer of material 324. For example, a length of the second, intermediate layer of material 322 along the first, longitudinal axis 306 may be less than 25%, 20%, 15%, 10%, 5%, 2%, or 1% of the length of the first, distal layer of material 320 along the first, longitudinal axis 306 and/or the length of the third, proximal layer of material 324 along the first, longitudinal axis 306. Thus, the second, intermediate layer of material 322 may form a relatively narrow strip or stripe or band of material that extends through and interrupts a much larger body of a single material that includes both the first, distal layer of material 320 and the third, proximal layer of material 324.

As also illustrated in FIG. 7, the second, intermediate layer of material 322 may be located closer to the distal end 304 than to the proximal end 302 of the contact pad 300. For example, the length of the first, distal layer of material 320 along the first, longitudinal axis 306 may be less than 25%, 20%, 15%, 10%, 5%, 2%, or 1% of the length of the third, proximal layer of material 324 along the first, longitudinal axis 306. As further illustrated in FIG. 7, the second, intermediate layer of material 322 may be oriented in a plane that is parallel or substantially parallel to the second, transverse axis 310, perpendicular or substantially perpendicular, such as within 30°, 25°, 20°, 15°, 10°, or 5° of perpendicular, to the first, longitudinal axis 306, and parallel or substantially parallel, such as within 30°, 25°, 20°, 15°, 10°, or 5° of parallel, to the third axis 316. The second, intermediate layer of material 322 may also be oriented parallel or substantially parallel, such as within 30°, 25°, 20°, 15°, 10°, or 5° of parallel, to the distal end surface 318 of the contact pad 300 and to the touch point thereof.

The second, intermediate layer of material 322 may be made of one or more materials that differ from the materials of the first, distal layer of material 320 and the third, proximal layer of material 324. In particular, the second intermediate layer of material 322 may include one or more materials that are or may be distinguishable from the materials of the first, distal layer of material 320 and the third, proximal layer of material 324 from a distance. For example, the second, intermediate layer of material 322 may be made of a UV-sensitive material, such as a fluorescent material that emits ultraviolet light, or may have a UV-sensitive coating, such as paint, acrylic, glitter, or adhesive, or may have such a material impregnated or embedded therein, while the first, distal layer of material 320 and the third, proximal layer of material 324 are either not made of such materials or are made of such materials having detectably and measurably different UV-sensitivity than the second, intermediate layer of material 322. In some cases, UV-sensitive materials may be particularly advantageous due to the absence of interference from background UV signals, or because the presence of UV wavelengths may be readily distinguishable and straightforward to isolate from the background.

As another example, the second, intermediate layer of material 322 may include an embedded radio-frequency identification ("RFID") tag, chip, circuit, or transponder 326, or other similar device, while the first, distal layer of material 320 and the third, proximal layer of material 324 either do not have such a device or have such a device that is detectably and measurably different than that of the second, intermediate layer of material 322. In some specific embodiments, the second, intermediate layer of material 322 may include an embedded radio-frequency identification ("RFID") tag, chip, circuit, or transponder 326, or other similar device, while the first, distal layer of material 320 and the third, proximal layer of material 324 include electromagnetic shielding that blocks or otherwise influences the signal power of radio frequency electromagnetic radiation travelling therethrough (i.e., radiofrequency shielding), such as a Faraday cage. In such embodiments, the shielding may affect the signal power of radio frequency signals travelling to and from the RFID tag 326. As another example, the second, intermediate layer of material 322 may be made of a material having a specific visible color such as a specific bright visible color, or may have coating, such as paint, pigment, acrylic, glitter, or adhesive, having a specific visible color such as a specific bright visible color, while the first, distal layer of material 320 and the third, proximal layer of material 324 do not include materials having such a visible color or include only materials having visible colors that are detectably and measurably different than those of the materials of the second, intermediate layer of material 322.

As a robotic system including a robotic manipulator and the contact pad 300 is operated to engage with physical objects in its environment, the contact pad 300 and the first, distal layer of material 320 thereof will typically wear down over time. In some embodiments, a robotic system including a robotic manipulator and the contact pad 300 may be operated in an environment that includes one or more sensors configured to detect that the first, proximal layer of material 320 has worn down to expose or partially expose the second, intermediate layer of material 322, or to determine or measure a degree to which the first, distal layer of material 320 has worn down. Such sensors may be configured to measure an intensity of incident UV radiation emitted from the second, intermediate layer of material 322 to determine an amount of wear, with no incident UV radiation measured indicating no or little wear, an intermediate amount of incident UV radiation measured indicating an intermediate amount of wear, and a high amount of incident UV radiation measured indicating a high degree or amount of wear. Such sensors may include a light meter, light intensity sensor, photodiode, or radiometer capable of detecting ultraviolet, ultraviolet A, and/or ultraviolet B light radiation.

Such sensors may also be configured to measure an intensity of incident radio waves emitted from the second, intermediate layer of material 322, such as from an RFID tag embedded therein, to determine an amount of wear, with no incident radio waves measured indicating no or little wear, an intermediate amount of incident radio waves measured indicating an intermediate amount of wear, and a high amount of incident radio waves measured indicating a high degree or amount of wear. Such sensors may include an RFID reader. Such sensors may also be configured to measure an intensity of incident visible light waves emitted from the second, intermediate layer of material 322, such as from a pigment of other colorful, such as brightly colored, material embedded therein, to determine an amount of wear, with no incident visible light waves of the specific color of the layer of material 322 measured indicating no or little wear, an intermediate amount of incident visible light waves of the specific color of the layer of material 322 measured indicating an intermediate amount of wear, and a high amount of incident visible light waves of the specific color of the layer of material 322 measured indicating a high degree or amount of wear. Such sensors may include human eyes, such as of a human operator or technician, or traditional imaging sensors, photographic cameras, or video cameras.

In some embodiments, the second, intermediate layer of material 322 may include a combination of one or more of a UV-sensitive material, an RFID tag, and a material having a visible color different than that of the first, distal layer of material 320 and the third, proximal layer of material 324. In such embodiments, the sensors employed within the environment of the robotic system may be configured to detect or measure a degree of visibility of each of the one or more of the UV-sensitive material, the RFID tag, and the material having a visible color.

While the second, intermediate layer of material 322 has been described herein as a distinct, generally planar layer, the second, intermediate layer of material 322 may take any one of various alternative forms. For example, in some embodiments, rather than the distinct layer of material 322, the contact pad 300 may include a UV-sensitive material or a colorful material, or one or more RFID tags as described herein in a gradient that increases, and that increases the intensity of the signals generated by such materials and components, as a distance from the distal end 304 of the contact pad 300 increases. Thus, in such embodiments, as the distal end 304 of the contact pad 300 is worn down during use, such components are increasingly exposed and the generated signals increase, and may be detected by one or more of the sensors described herein to detect or measure a degree to which the distal end 304 of the contact pad 300 has worn down.

In other embodiments, the second, intermediate layer of material 322 may have a curved shape, such as a concave shape or a convex shape as viewed from the distal end 304 of the contact pad 300, rather than a planar shape. In such embodiments, the specific curvature of the second, intermediate layer of material 322 may be configured to allow for earlier detection of wear in certain areas of the distal end surface 318 of the contact pad 300, such as in areas that are either more or less prone to wear, than in others. For example, if the second, intermediate layer of material 322 has a concave shape as viewed from the distal end 304 of the contact pad 300, then even wear of the distal end surface 318 of the contact pad 300 will be detected at the edges or periphery of the distal end surface 318 of the contact pad 300 before it is detected at a central region of the distal end surface 318 of the contact pad 300. As another example, if the second, intermediate layer of material 322 has a convex shape as viewed from the distal end 304 of the contact pad 300, then even wear of the distal end surface 318 of the contact pad 300 will be detected at the edges or periphery of the distal end surface 318 of the contact pad 300 after it is detected at a central region of the distal end surface 318 of the contact pad 300. In yet other embodiments, the second, intermediate layer of material 322 may take the form of a spot, a circle, a dot, or a series of deposits in the form of a line, wave, or other pattern, rather than the form of a relatively planar layer as illustrated in FIG. 7.

Figure 8:
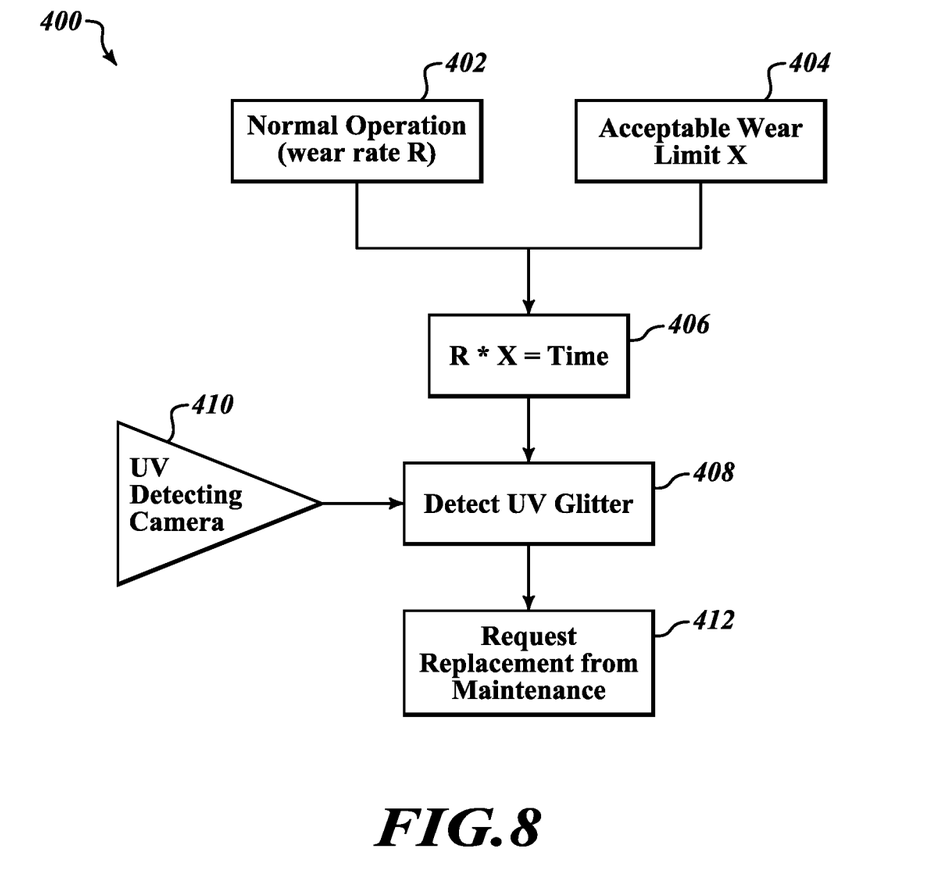
FIG. 8 illustrates a flowchart of a method according to an embodiment of the present disclosure.

FIG. 8 illustrates a workflow or a method 400 of using the features described herein. A computer software control system may be provided with an input 402 representing a wear rate "R" that is representative of the rate at which a contact pad of a robotic manipulator is expected to wear down during normal operation. The computer software control system may also be provided with an input 404 representing an acceptable wear limit "X." By multiplying the two inputs R and X, at 406, the computer software control system may compute an allowable or acceptable time-of-use for the contact pad. The computer software control system may be provided with signals from one or more sensors 410, such as UV sensors or cameras, RFID readers, visible light cameras, or other electromagnetic signal sensors, where the signals received from the sensors are representative of signals of interest (e.g., UV radiation, radio waves, visible light in specific colors) detected by the one or more sensors, which may indicate a degree of wear on the contact pad. The computer software control system may determine, at 408, that the signal provided by one or more sensor, such as a UV sensor, an RFID reader, or a visible light camera, indicates that the contact pad has worn down to or beyond a threshold level.

In some embodiments, if the computer software control system makes such a determination for a single contact pad, at 412, then operation of the robotic system including the robotic manipulator and the contact pad is halted, stopped, or ceased, and the computer software system may send an alert to an operator, technician, or automated machinery to perform maintenance on the robotic manipulator and its contact pad, such as replacing, repairing, or otherwise correcting the contact pad. In some embodiments, if the computer software control system makes such a determination for only a single contact pad, then no action is taken. In some embodiments, if the computer software control system makes such a determination for two or more contact pads, at 412, then operation of the robotic system including the robotic manipulator and the contact pads is halted, stopped, or ceased, and the computer software system may send an alert to an operator, technician, or automated machinery to perform maintenance on the robotic manipulator and its contact pads, such as replacing, repairing, or otherwise correcting the contact pads. In some embodiments, if the computer software control system makes such a determination for a majority of the contact pads in a robotic system, at 412, then operation of the robotic system including the robotic manipulator and the contact pads is halted, stopped, or ceased, and the computer software system may send an alert to an operator, technician, or automated machinery to perform maintenance on the robotic manipulator and its contact pads, such as replacing, repairing, or otherwise correcting the contact pads.

In some embodiments, the computer software control system may store data representative of the actual amount of time that passes until a contact pad wore down to a threshold level, and compare such to the computed allowable or acceptable time-of-use for the contact pad. Such a comparison may be used to update stored information regarding wear rates and time-of-use, such as in machine learning, recursive learning, reinforcement learning, or artificial intelligence applications. In some embodiments, the systems described herein may be used in conjunction with recursive and/or reinforcement learning techniques, so that over time, the system can intelligently predict when a particular type of finger-tip or contact pad may be nearing a worn state, and the finger-tip can be proactively addressed, rather than after a worn state has occurred. This could prevent slippage or other malfunctioning by robotic manipulators.

Furthermore, machine learning, reinforcement learning, recursive learning, fuzzy logic, neural network, and other related techniques can be used to determine the effects of a particular type of robotic manipulator deployment on the finger-tips or contact pads. For example, over time, the system may be able to determine whether certain types of objects, certain frequencies of grasping, certain grasping operations, certain grasping durations, or other variables, decrease the life span of finger-tips and contact pads. In such scenarios, future deployments in similar settings can be fitted with more durable finger-tips or contact pads to prevent maintenance downtime and reduce the costs of finger-tip repairs and/or replacements, or can be fitted with less durable finger tips or contact pads to reduce costs of installation.

The systems and techniques described herein allow a level of wear of a contact pad of a robotic manipulator to be autonomously detected, measured, or recognized without intervention or assistance from a human operator.

U.S. provisional patent application No. 62/772,812, filed Nov. 29, 2018, is hereby incorporated herein by reference in its entirety. The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A contact pad for use in a robotic manipulator, comprising:
   a body having a proximal end and a distal end opposite to the proximal end across a length of the contact pad, a first side and a second side opposite to the first side across a thickness of the contact pad, and a first edge and a second edge opposite to the first edge across a width of the contact pad;
   a touch point at the distal end of the body; and
   a layer of fluorescent material embedded within the body.

2. The contact pad of claim 1 wherein the layer of fluorescent material has a visible color that is different than a visible color of the rest of the body of the contact pad.

3. The contact pad of claim 1, wherein:
   the layer of fluorescent material includes an embedded radio-frequency identification tag; and
   a sensor external to the body is configured to detect incident radio waves emitted from the embedded radio-frequency identification tag such that a degree of wear of the body can be determined based on an intensity of incident radio waves detected by the sensor.

4. The contact pad of claim 1 wherein the contact pad is formed from an electrically conductive material.

5. The contact pad of claim 1 wherein the contact pad includes an aperture that extends from the first side to the second side.

6. The contact pad of claim 1 wherein the contact pad includes a distal layer of material and a proximal layer of material, and the layer of fluorescent material is located between the distal layer of material and the proximal layer of material.

7. The contact pad of claim 6 wherein a length of the layer of fluorescent material along the length of the body of the contact pad is less than 25% of a length of the distal layer of material along the length of the contact pad and less than 25% of a length of the proximal layer of material along the length of the contact pad.

8. The contact pad of claim 6 wherein a length of the distal layer of material along the length of the body of the contact pad is less than 25% of a length of the proximal layer of material along the length of the body of the contact pad.

9. The contact pad of claim 6 wherein the layer of fluorescent material is oriented substantially parallel to the thickness of the body of the contact pad, within 30° of perpendicular to the length of the body of the contact pad, and within 30° of parallel to the width of the body of the contact pad.

10. The contact pad of claim 6 wherein the layer of fluorescent material is oriented within 30° of parallel to the touch point at the distal end of the body of the contact pad.

11. A robotic system comprising:
    a robotic manipulator including a contact pad, wherein the contact pad includes a body having a proximal end and a distal end opposite to the proximal end across a length of the contact pad, a first side and a second side opposite to the first side across a thickness of the contact pad, and a first edge and a second edge opposite to the first edge across a width of the contact pad;
    a touch point at the distal end of the body of the contact pad; and
    a radio-frequency identification tag embedded within the body of the contact pad.

12. The robotic system of claim 11 wherein the radio-frequency identification tag is embedded within a layer of fluorescent material within the body of the contact pad.

13. The contact pad of claim 12 wherein the layer of fluorescent material has a visible color that is different than a visible color of the rest of the body of the contact pad.

14. A robotic system, comprising:
    a robotic manipulator including a contact pad, wherein the contact pad includes a body having a proximal end and a distal end opposite to the proximal end across a length of the contact pad, a first side and a second side opposite to the first side across a thickness of the contact pad, and a first edge and a second edge opposite to the first edge across a width of the contact pad;
    a touch point at the distal end of the body of the contact pad;
    a source of electromagnetic radiation embedded within the body of the contact pad; and
    a sensor configured to detect electromagnetic radiation generated by the source of electromagnetic radiation embedded within the body of the contact pad and communicate a measurement of the electromagnetic radiation to a control system.

15. The robotic system of claim 14, wherein the source of electromagnetic radiation is a layer of fluorescent material embedded within the body of the contact pad.

16. The robotic system of claim 15, wherein the sensor is a photodiode.

17. The robotic system of claim 14 wherein the source of electromagnetic radiation is a layer of material that has a visible color different than a visible color of the rest of the body of the contact pad.

18. The robotic system of claim 17, wherein the sensor is a camera.

19. The contact pad of claim 14 wherein the source of electromagnetic radiation is an embedded radio-frequency identification tag.

20. The robotic system of claim 19, wherein the sensor is a radio-frequency identification reader.

* * * * *